US012345932B2

(12) United States Patent
Nie et al.

(10) Patent No.: US 12,345,932 B2
(45) Date of Patent: Jul. 1, 2025

(54) DIE LAST AND WAVEGUIDE LAST ARCHITECTURE FOR SILICON PHOTONIC PACKAGING

(71) Applicant: Intel Corporation, Santa Clara, CA (US)

(72) Inventors: Bai Nie, Chandler, AZ (US); Pooya Tadayon, Portland, OR (US); Leonel R. Arana, Phoenix, AZ (US); Yonggang Li, Chandler, AZ (US); Changhua Liu, Chandler, AZ (US); Kristof Darmawikarta, Chandler, AZ (US); Srinivas Venkata Ramanuja Pietambaram, Chandler, AZ (US); Tarek A. Ibrahim, Mesa, AZ (US); Hari Mahalingam, San Jose, CA (US); Benjamin Duong, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 17/483,013

(22) Filed: Sep. 23, 2021

(65) Prior Publication Data

US 2023/0087124 A1    Mar. 23, 2023

(51) Int. Cl.
 *G02B 6/42* (2006.01)
 *G02B 6/43* (2006.01)

(52) U.S. Cl.
 CPC ............. *G02B 6/4243* (2013.01); *G02B 6/43* (2013.01)

(58) Field of Classification Search
 None
 See application file for complete search history.

(56) References Cited

U.S. PATENT DOCUMENTS

| 12,032,216 B2 * | 7/2024 | Brusberg ............... G02B 6/423 |
| 2009/0238233 A1 * | 9/2009 | Bchir ................. G02B 6/02042 |
| | | 257/E31.095 |
| 2019/0285804 A1 * | 9/2019 | Ramachandran ...... G02B 6/421 |
| 2020/0132946 A1 * | 4/2020 | Bchir ..................... G02B 6/421 |
| 2021/0041649 A1 | 2/2021 | Brusberg et al. |

FOREIGN PATENT DOCUMENTS

EP    3872547 A1 *    9/2021    ........... G02B 6/4228

* cited by examiner

*Primary Examiner* — Jerry Rahll
(74) *Attorney, Agent, or Firm* — Akona IP PC (57) ABSTRACT

Various embodiments disclosed relate to photonic assemblies. The present disclosure includes methods for packaging a photonic assembly, including attaching a bridge die to a glass substrate, attaching an electronic integrated circuit die to the glass substrate and the bridge die, attaching a photonic integrated circuit die to the glass substrate and the bridge die, bonding a coupling adapter to the glass substrate and in situ forming a waveguide in the coupling adapted, the waveguide aligning with the photonic integrated circuit die.

19 Claims, 6 Drawing Sheets

DIE LAST AND WAVEGUIDE LAST ARCHITECTURE FOR SILICON PHOTONIC PACKAGING

TECHNICAL FIELD

Embodiments described herein generally relate to semiconductor assembly architecture, and specifically to semiconductor assemblies with silicon photonics.

BACKGROUND

Silicon photonics are a good candidate for low cost and high performance components, such as for increasing data centric technology. But packaging silicon photonics can be challenging, and result in compatibility and integration challenges due to mode field diameter mismatch and tight alignment tolerance. It is desired to have a low cost and efficient packaging technology that address these concerns, and other technical challenges.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Disclosed herein is a semiconductor assembly and method of making the same for Silicon Photonics (SiP) packaging with a waveguide. Here, laser based technology is used to integrate a photonic integrated circuit (PIC), an electronic integrated circuit (EIC) and a substrate, with low-loss coupling between an optical fiber and SiP packaging. Laser made glass-to-glass bonds are used, and an embedded waveguide is made through laser direct writing (LDW).

Silicon photonics (SiP) is a combination of silicon integrated circuits and semiconductor lasers, from which photonic integrated circuits (PICs) can be made. PICs can produce or detect optical light with single or multiple frequencies. PICs can extend, enable, and increased data transmission, while consuming less power than conventional circuits. Such PICs can allow for energy efficient bandwidth scaling. PICs can allow for faster data transmission over longer distances compared to traditional electronics.

However, silicon photonics packaging can be challenging. Fiber coupling compatibility and integration with electronic integrated circuits (EIC) can be difficult due to mode field diameter mismatches and tight alignment tolerances. The use of waveguides in glass can be a good solution for such SiP packaging, due in part to the optical and mechanical properties of glass.

Discussed herein, laser based technology can be leveraged to integrate PICs, EICs, and substrates. Laser based technology can also enable in situ waveguide formation in glass substrates to create low-loss coupling between SiP packages and coupling fibers. In situ formation of the waveguide can minimize the coupling loss between PIC and the package. Both low temperature glass-to-glass bonding by laser and embedded waveguide in glass by laser direct writing can be used. The discussed methods and devices can allow for creation of low loss and high voltage compatible SiP packaging.

In an example, semiconductor assembly can include a first glass substrate, an electronic integrated circuit ("EIC"), a photonic integrated circuit ("PIC") configured to produce or receive single or multiple optical frequencies, the PIC comprising an optical port, a bridge die connecting the PIC and the EIC dies, wherein the bridge die is embedded in the first glass substrate, and a coupling adapter. The coupling adapter can include a coupling port configured for connecting to an optical fiber and a waveguide comprising a laser-modified pathway extending from the output port, wherein the waveguide is integrated with the coupling adapter.

In an example, an electronic device can include a semiconductor assembly comprising: a first glass substrate, a first integrated circuit die, a second integrated circuit die configured to produce an optical frequency, a bridge die connecting the first and second integrated circuit dies, wherein the bridge die is embedded in the first glass substrate, and a coupling adapter comprising: a coupling port, an output port configured for connection to the second integrated circuit die; and a housing at least partially enclosing the semiconductor assembly.

In an example, a method of making a semiconductor can include attaching a bridge die to a glass substrate, attaching an electronic integrated circuit die to the glass substrate and the bridge die, attaching a photonic integrated circuit die to the glass substrate and the bridge die, wherein the electronic integrated circuit die is electrically coupled to the photonic integrated circuit die through the bridge die, bonding a coupling adapter to the glass substrate, and forming a waveguide in the coupling adapted, the waveguide aligning with the photonic integrated circuit die.

Figure 1:
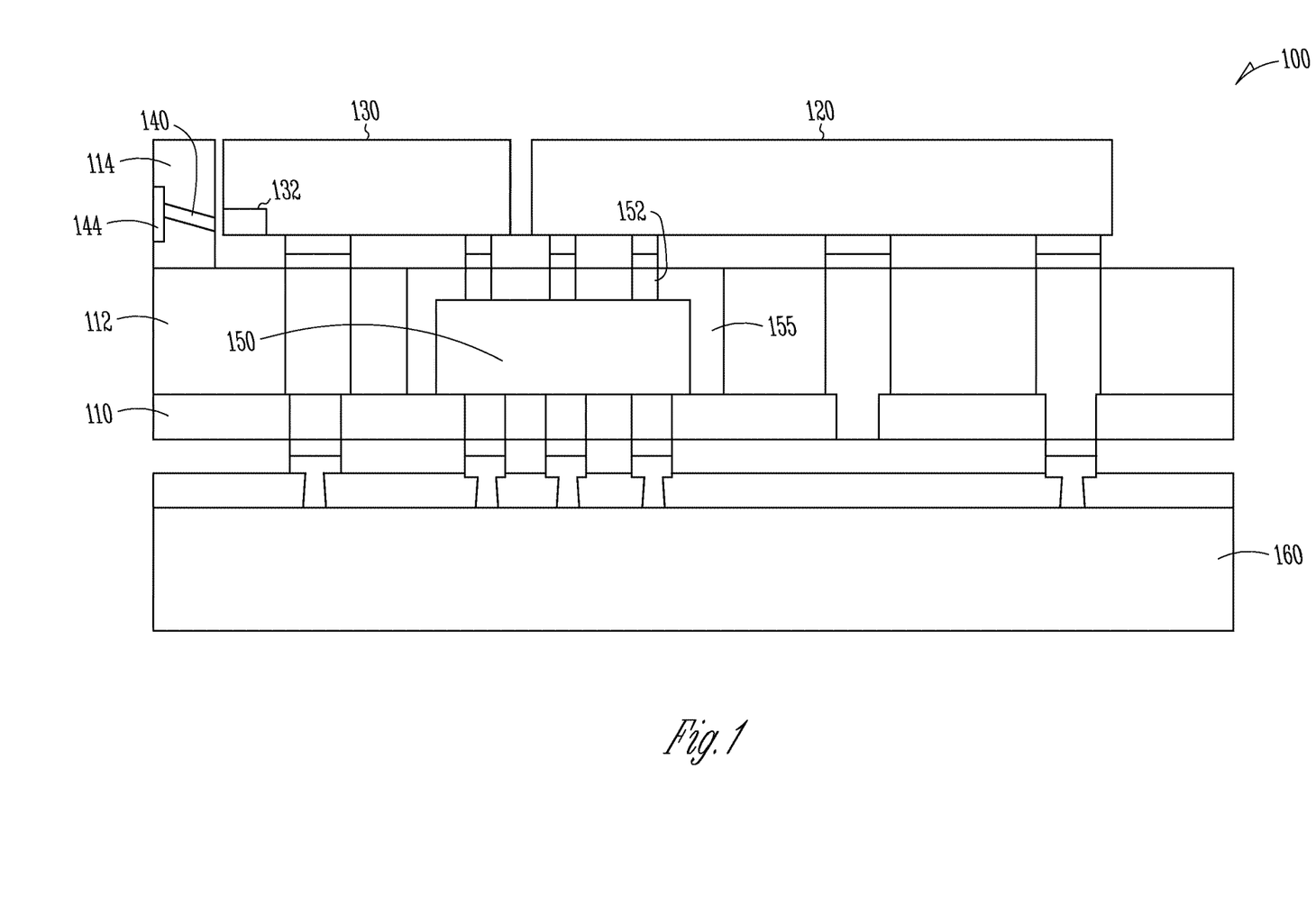
FIG. 1 illustrates a semiconductor assembly in an example.

FIG. 1 illustrates a semiconductor assembly 100 in an example. The semiconductor assembly 100 can include a first glass substrate 110, a second glass substrate 112, a glass adapter 114, a first integrated circuit 120, a second integrated circuit 130 with an optical port 132, a waveguide 140, a fiber port 144, a bridge die 150 with connections 152, and a substrate 160.

In the assembly 100, the substrate 160 can host the glass substrates 110 and 112. The bridge die 150 can be situated in the glass substrate 112, connecting the first integrated circuit 120 and the second integrated circuit 130. The waveguide 140 can be situated within a glass adapter 114, and aligned with an optical port 132 of the second integrated circuit 130.

The glass substrates 110, 112, and adapter 114, can be, for example, a silicon dioxide or borosilicate glass. In some cases, alternative glass materials can be used. Shown in FIG. 1, the glass substrates 110, 112 are two stacked and bonded glass substrates, while the glass adapter 114 is a separate piece hosting the waveguide 140 and fiber coupling unit. In some cases, more or less glass substrates can be stacked and used. The glass substrates 110, 112 can serve, for example, as an interposer between the first and second integrated circuit dies 120, 130. In assembly 100, the bridge die 150 can be at least partially embedded in the glass substrate 110.

The glass substrates 110, 112 can be bonded to each other, such as through laser techniques. In some cases, the glass substrates 110, 112 can be fused together by one or more bonds, such as by laser scanning. The two glass substrates can be bonded in a hermetic and gas-tight seal.

The glass adapter 114 can, for example, be a coupling adapter for connecting the second integrated circuit 130 (e.g., a PIC) to one or more optical fibers. The coupling adapter can include a coupling port 144, and host the waveguide 140 itself. The waveguide 140 can be a laser-modified pathway through the glass adapter 114.

The first integrated circuit 120 can be an electronic integrated circuit. The second integrated circuit 130 can be a photonic integrated circuit (PIC). A PIC can be configured to produce and receive multiple optical signals, such as in the visible or infrared (IR) spectrum. In some cases, either or both of the first integrated circuit 120 and the second integrated circuit 130 can be encapsulated by an over-mold layer (not shown). The second integrated circuit 130 can include single or multiple optical port 132 where optical signals exit the second integrated circuit 130 towards the waveguide 140 in the glass adapter 114.

The waveguide 140 can be a laser-modified waveguide situated in the glass adapter 114. The glass adapter 114 can be a separate piece of glass bonded to the other glass substrate and aligned with the second integrated circuit die 130. The waveguide 140 can be in the glass adapter 114, extending between the coupling port 144 and the optical port 132 of the second integrated circuit 130.

The waveguide 140 can be configured to guide electromagnetic waves, such as an optical signal produced by the second integrated circuit 130 and provided at the optical port 132, from the assembly 100 out towards an outlet. The waveguide 140 can be connected to one or more optical fibers or other types of outputs for such an optical signal. For example, the waveguide 140 can be aligned with the coupling port 144 which is size and shaped for connection to an optical fiber. In some cases, such a coupling port 144 can include V-grooves for connection with an optical fiber.

Figure 2:
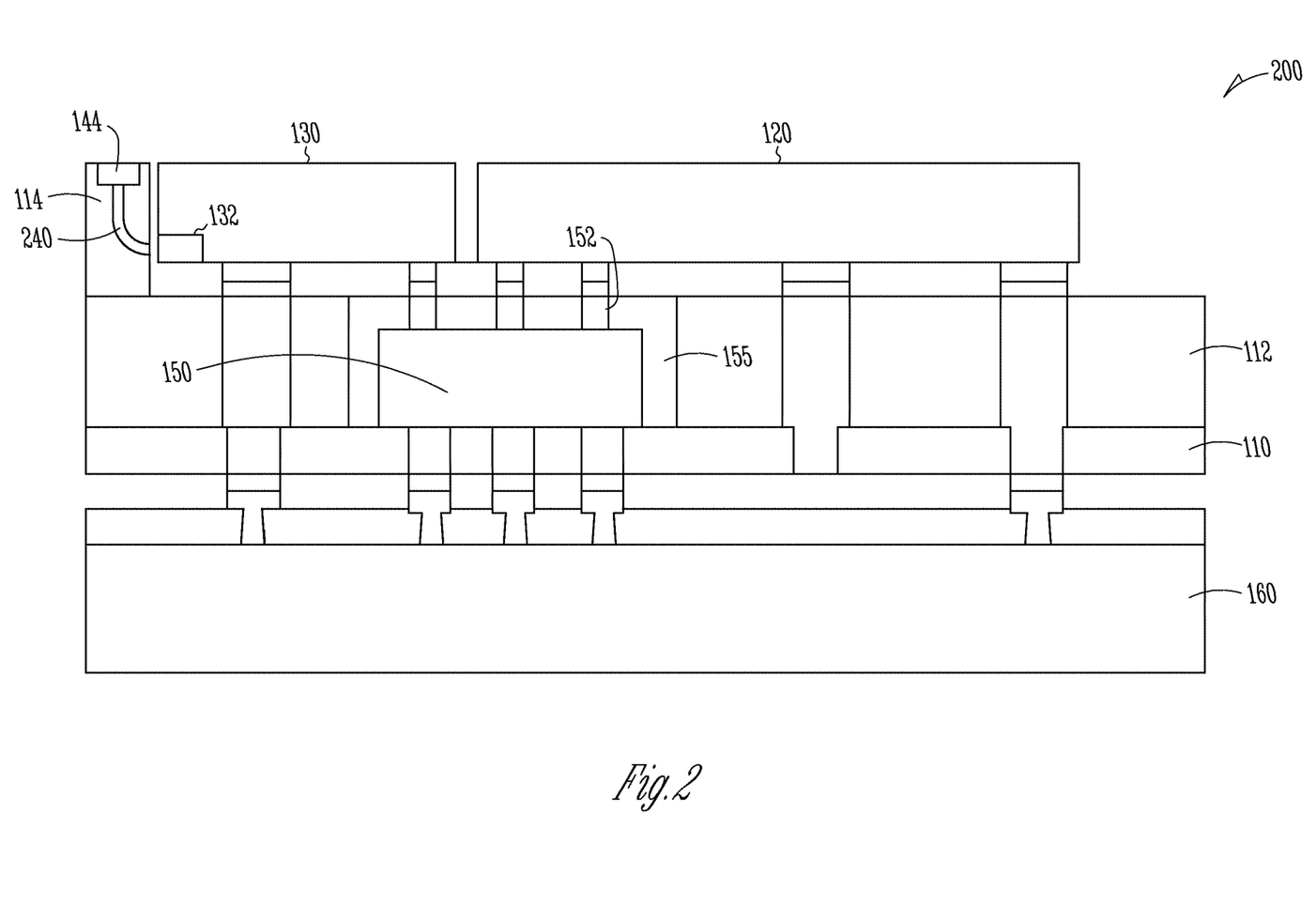
FIG. 2 illustrates a semiconductor assembly in an example.

The waveguide 140 can be a laser-modified guide, such as by laser direct writing (LDW), as discussed below with reference to FIGS. 3A-I below. The waveguide 140 can be manufactured within the glass adapter 114 (e.g., the coupling adapter) for proper alignment with the optical port 132 on the second integrated circuit 130. For example, the waveguide 140 can be cut at an angle allowing for appropriate alignment and guidance of optical signals produced by the second integrate circuit 130 (e.g., a PIC). In some cases, the waveguide 140 can be curved, as shown in FIG. 2. In some cases, the coupling port 144 can exit out the glass adapter 114 on a top surface, a side surface, or other appropriate surface.

The bridge die 150 can be an embedded multi-die interconnect bridge (EMIB). The bridge die 150 can additionally include connections 152, such as vias, traces, or other electrical connections so as to connect the first integrated circuit die 120 with the second integrated circuit die 130. The bridge die 150 can be partially or fully embedded in one or more of the glass substrates 110, 112. In some cases, the bridge die 150 can be encapsulated with a mold material. In some cases, the bridge die 150 can be a silicon bridge. In some cases, the bridge die 150 can be an active die, or a passive die.

When included in a device, the assembly 100 can be partially or fully encased in a housing. The assembly 100 can be used, for example, in a device with a touch screen, keyboard, or other input feature. When shown in cross-section, the architecture of the assembly 100 can be detected. Additionally, the structure of the waveguide 140 in the glass substrates 110, 112, 114, and any coupling adapter can be detected from a cross section, as can a change in refractive index between the glass substrates and the waveguide 140.

FIG. 2 illustrates a semiconductor assembly 200 with an in situ manufactured waveguide in an example. Assembly 200 includes similar components to those of assembly 100 discussed above, connected in the same fashion. However, the waveguide 240 of assembly 200 is of a different shape. The waveguide 240 is curved instead of angled. For this reason, the waveguide 240 can exit to the coupling port 144 at a top surface of the assembly 200 instead of a side surface. This can allow for flexibility in connections to optical fibers.

FIGS. 3A-3I illustrate a method 300 of making a semiconductor assembly in an example. The method 300 can include laser based glass bonding of substrates and laser based waveguide formation. These techniques can be accomplished by laser direct writing (LDW).

Figure 3A:
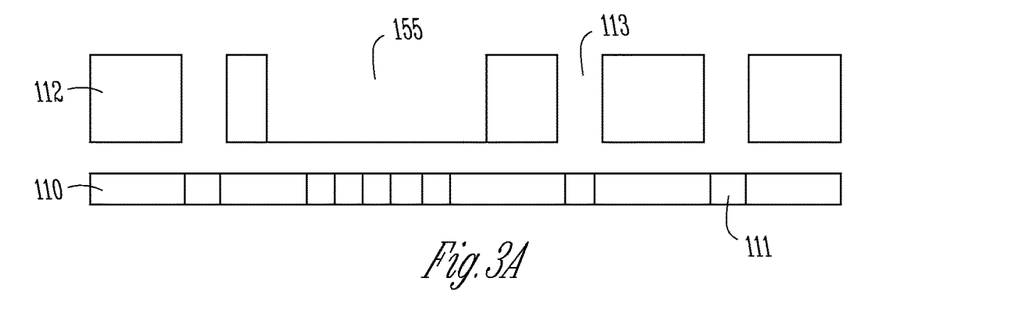
FIGS. 3A-3I shows a flow diagram of a method of making a semiconductor assembly in an example.
Figure 3B:
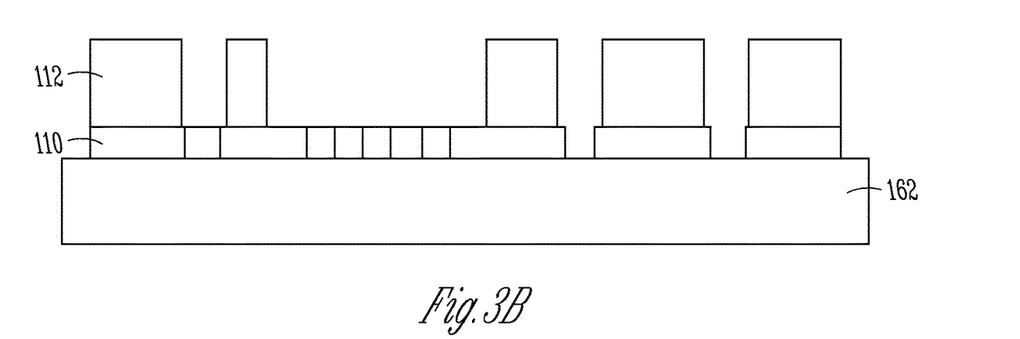

First, two glass substrates 110, 112, can be prepared (FIG. 3A). Here, the first glass substrate 110 can include plated through glass via (TGV) 111, and the second glass substrate 112 can include non-plated TGV 113 and a cavity 155. In some cases, multiple cavities can be used, and multiple bridges or other non-bridge devices can be included. Next, the two glass substrates 110, 112, are bonded together by laser scanning (FIG. 3B). In this process, a hermetic and gas-tight seal can be achieved. This method can be accomplished with low heat load. Optionally, a carrier 162 can be used. In some cases, a protection film can be used instead of a carrier 162.

Figure 3C:
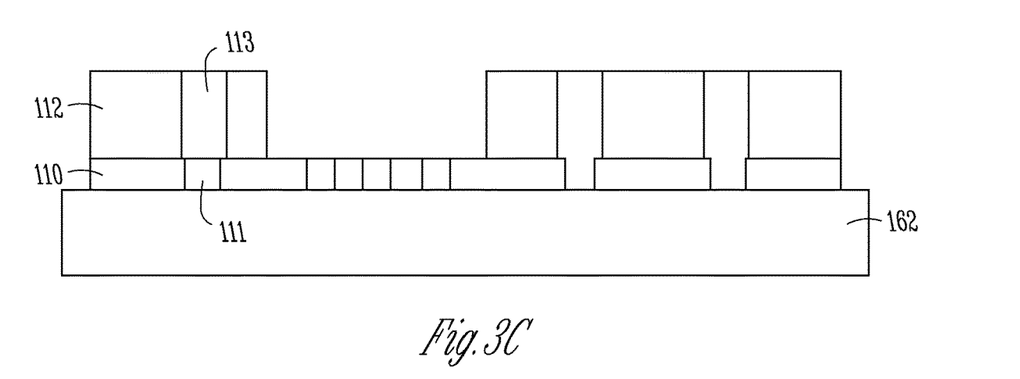
Figure 3D:
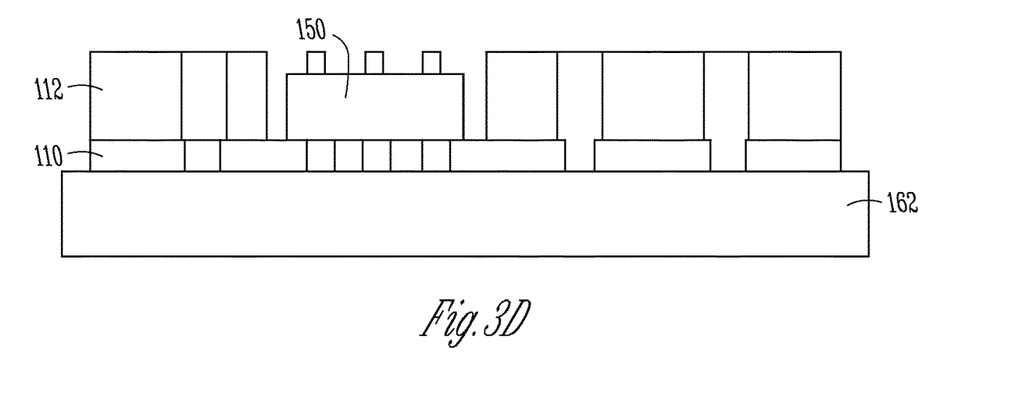
Figure 3E:
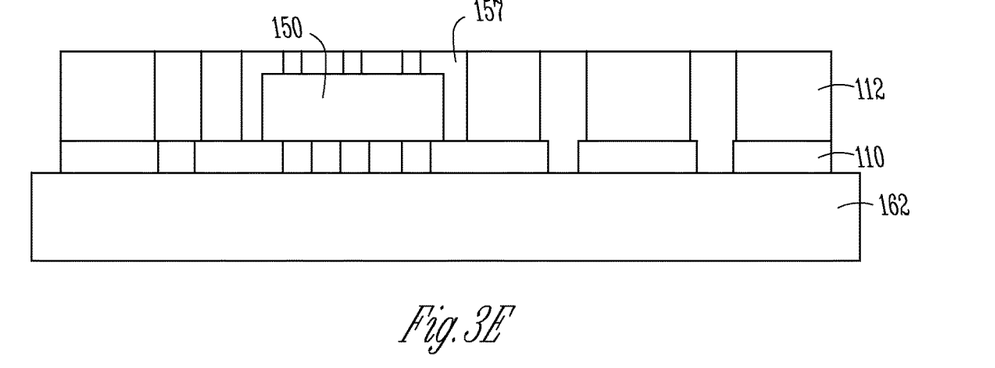

After the glass substrate bonding, the TGV 113 can be plated (FIG. 3C). The bridge die 150 can then be placed in the cavity 155 (FIG. 3D) and encapsulated in a mold material 157 (FIG. 3E). In some cases, a dielectric material, such as ABF, can be used to encapsulate. The top surface of bridge die cavity 155 can be treated with planar or polish techniques to make it even with the glass 112 surface after bridge encapsulation. In some cases, the bridge die cavity 155 can be underfilled after placement of the first and second integrated circuit dies 120, 130.

Figure 3F:
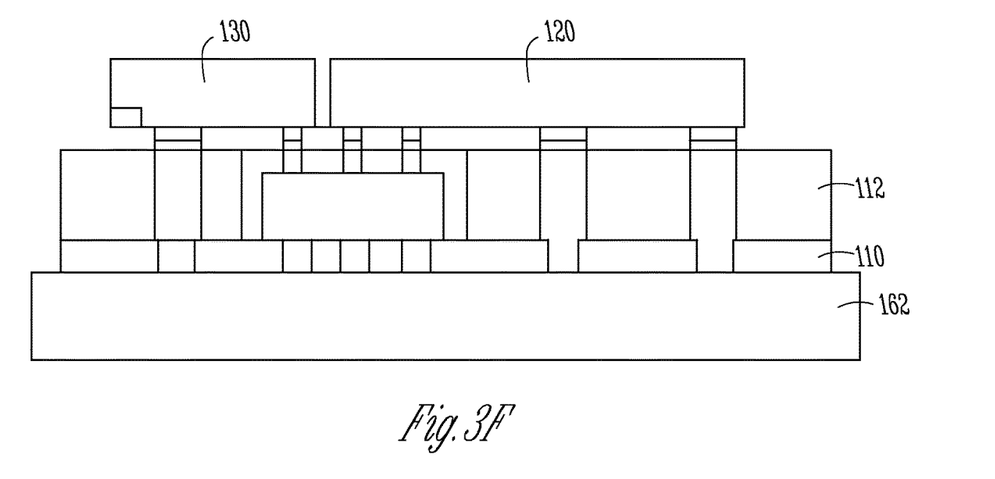

The first and second integrated circuit dies 120, 130 can be placed and electrically connected to the bridge die 150 (FIG. 3F). The first and second integrated circuit dies 120, 130 can be bonded to the bridge die 150 and TGV 113 in the glass substrate 112.

Figure 3G:
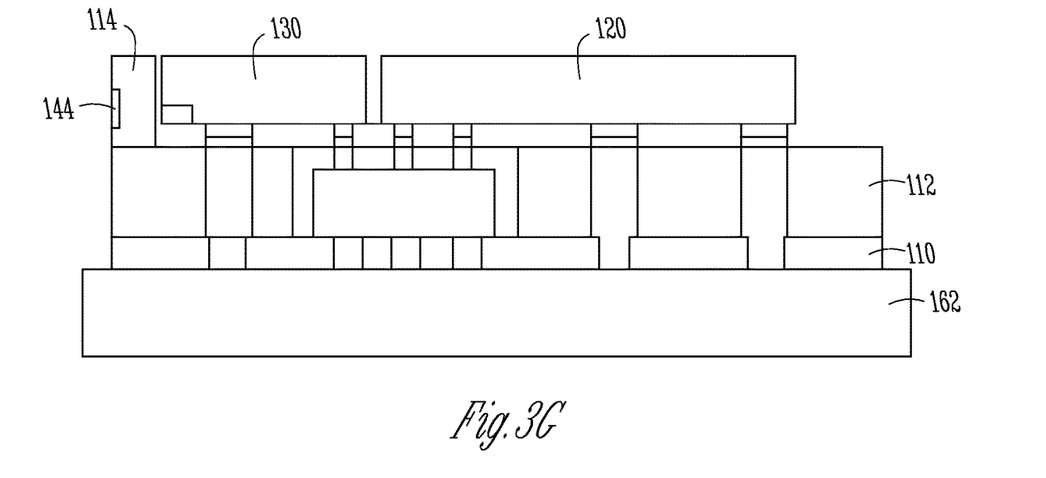

Once the first and second integrated circuit dies 120, 130 are placed and bonded, the glass adapter 114, which serves as a coupling adapter, can be bonded to the glass substrate 112 (FIG. 3G). The glass adapter 114 can be bonded through laser writing to the glass substrate 112.

Figure 3H:
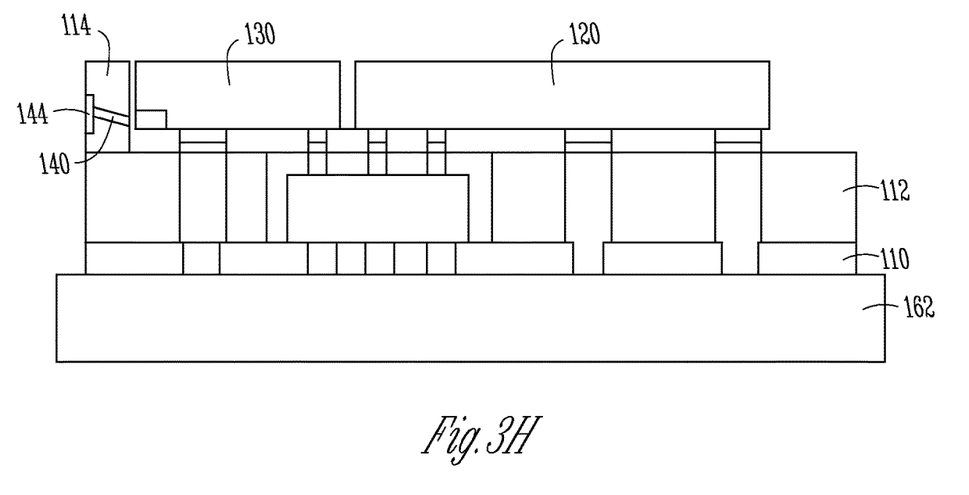

The glass adapter 114 can be a pre-fabricated coupling adapter including the waveguide 140. The glass adapter 114 can further include coupling port 144 for compatibility with optical fibers. The glass adapter 114 can be placed so that it is aligned with the optical port 132 of the second integrated circuit die 130 (a PIC). In some cases, the waveguide 140 can be pre-fabricated in the glass adapter 114. In some cases, the waveguide 140 can be fabricated in situ after placement of the glass adapter 114 and alignment with the optical port 132 (FIG. 3H).

The pre-fabricated glass adapter 114 can include a pre-fabricated coupling port 144. The coupling port 144 can include etched or otherwise made V-grooves. In some cases, micro-lens arrays fabricated with laser direct writing and chemical etching can be used. In some cases, an isolator can be included to prevent back-reflection in the adapter 114. The coupling port 144 can be on a side or top surface of the adapter 114.

In situ formation of the waveguide 140 can be done by laser technology. The waveguide can be formed in the glass adapter 114 by laser formation, such as by LDW. The position of the waveguide 140 can be adjusted during formation, based on the placement of the PIC (the second integrated circuit die 130). This can be dynamically updated during the in situ process. In some cases, reference marks can be made on the carrier substrate 162 earlier during the process for easier alignment.

LDW can include focusing laser energy in three dimensions within the glass adapter 114 and locally transforming the glass adapter 114 media in a linear path. In an example, transforming can include locally modifying an index of refraction due to interaction with laser light. For example, with the waveguide 140, the refractive index of the glass adapter 114 at the waveguide 140 can differ from the refractive index of the rest of the glass adapter 114, once formed. The waveguide can be a local change in the glass, such as a structural modification (e.g., local stresses, material phase change, or material density change) caused by the laser writing.

Formation of the waveguide 140, such as by LDW, can be done after placement of the glass adapter 114 to maximize coupling efficiency and alignment with the second integrated circuit die 130. In this case, metrology can be used to measure the positioning of both the glass adapter 114 and the second integrated circuit die 130; this methodology can be used to obtain x, y, z coordinate positions. The waveguide 140 can then be formed along an appropriate writing route based on the metrology x, y, z coordinate positions.

LDW can be sensitive depending on laser focus. Thus, RI can be modulated in the focal plane (or with depth of focus) owing the high laser peak intensity. The focal depth of the laser can be precisely controlled during writing of the waveguide 140. For example, a depth of focus of 1 micrometer can be used with a 0.65 NA lens. By comparison, a depth of focus of 0.4 micrometer can be used with a 0.85 NA lens. The use of such precise LDW techniques for waveguide formation can allow for proper alignment and reduce misalignment. During writing, the z or x-y positions can be varied along the scanning path by controlling the laser beam position. For example, with a propagation loss in the laser can be less than about 0.1 dB/cm.

Figure 3I:
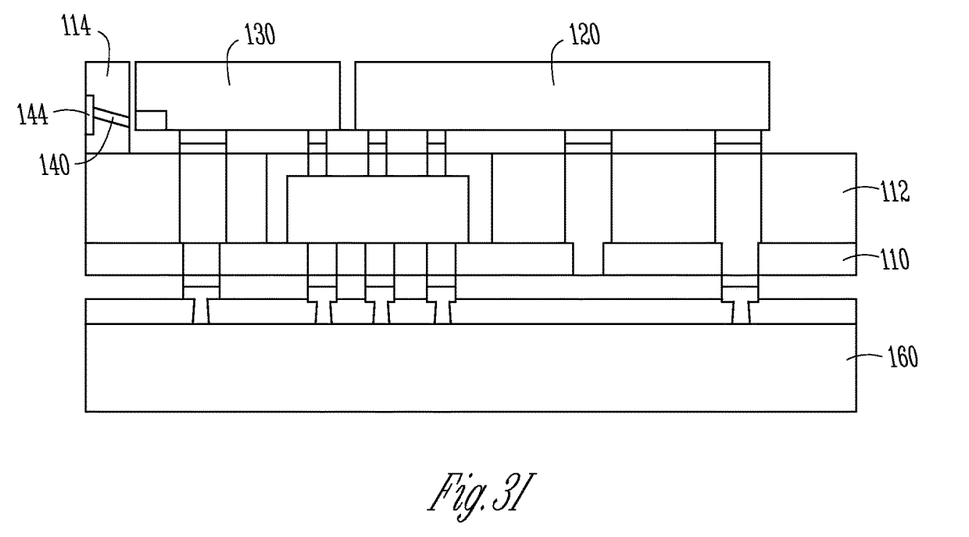

Once the glass adapter 114 is attached and the waveguide 140 is formed, the assembly 100 can be attached to a substrate 160 and removed from a carrier 162 (FIG. 3I). At this point, the assembly can be further packaged for use in a device, and optical fibers can be attached via the glass adapter 114.

Figure 4:
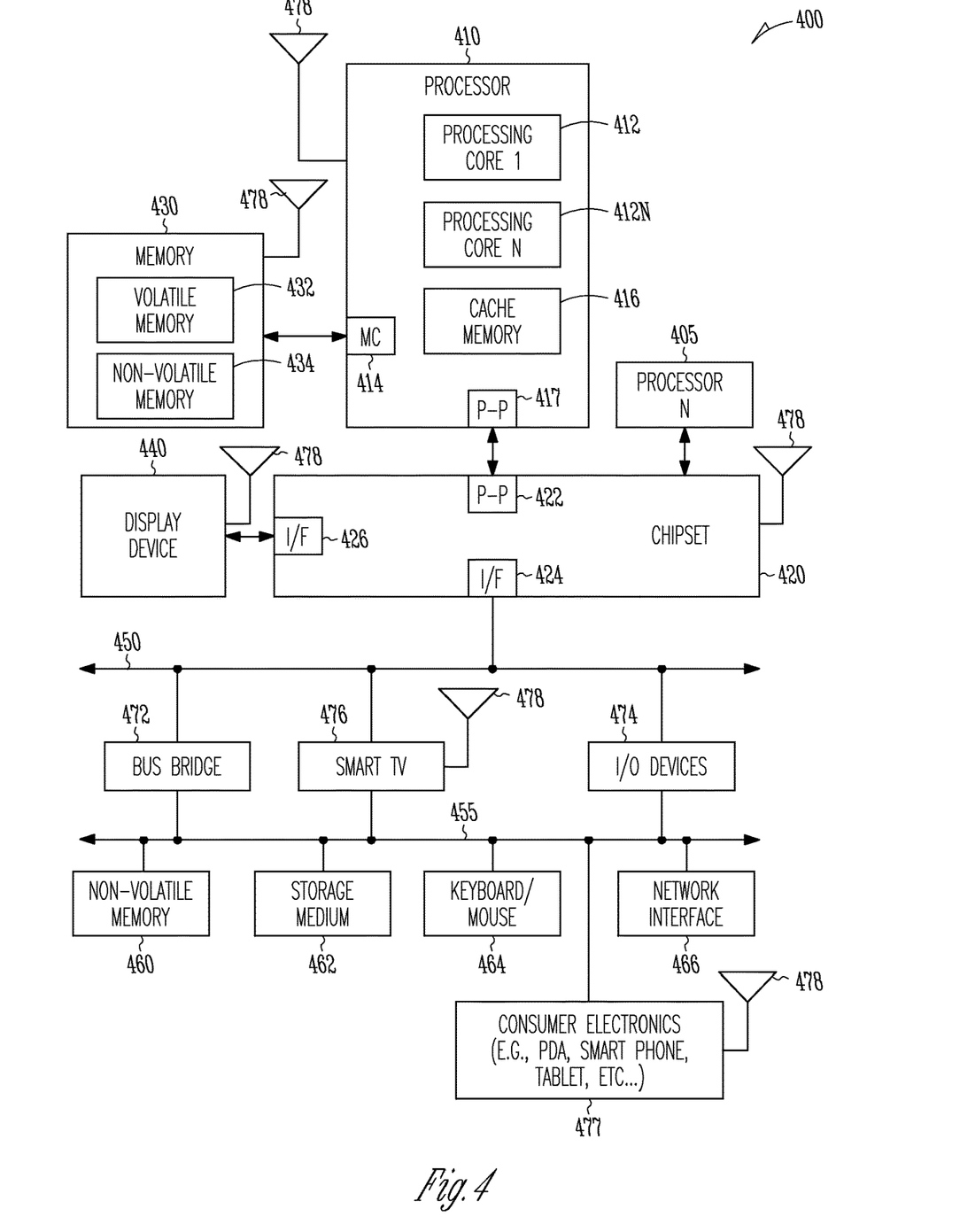
FIG. 4 illustrates an example system level diagram.

FIG. 4 illustrates a system level diagram, depicting an example of an electronic device (e.g., system) that may include a photonic assembly and/or methods described above. In one embodiment, system 400 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 400 includes a system on a chip (SOC) system.

In one embodiment, processor 410 has one or more processor cores 412 and 412N, where 412N represents the Nth processor core inside processor 410 where N is a positive integer. In one embodiment, system 400 includes multiple processors including 410 and 405, where processor 405 has logic similar or identical to the logic of processor 410. In some embodiments, processing core 412 includes, but is not limited to, pre-fetch logic to fetch instructions, decode logic to decode the instructions, execution logic to execute instructions and the like. In some embodiments, processor 410 has a cache memory 416 to cache instructions and/or data for system 400. Cache memory 416 may be organized into a hierarchal structure including one or more levels of cache memory.

In some embodiments, processor 410 includes a memory controller 414, which is operable to perform functions that enable the processor 410 to access and communicate with memory 430 that includes a volatile memory 432 and/or a non-volatile memory 434. In some embodiments, processor 410 is coupled with memory 430 and chipset 420. Processor 410 may also be coupled to a wireless antenna 478 to communicate with any device configured to transmit and/or receive wireless signals. In one embodiment, an interface for wireless antenna 478 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 432 includes, but is not limited to, Synchronous Dynamic Random Access Memory (SDRAM), Dynamic Random Access Memory (DRAM), RAIVIBUS Dynamic Random Access Memory (RDRAM), and/or any other type of random access memory device. Non-volatile memory 434 includes, but is not limited to, flash memory, phase change memory (PCM), read-only memory (ROM), electrically erasable programmable read-only memory (EEPROM), or any other type of non-volatile memory device.

Memory 430 stores information and instructions to be executed by processor 410. In one embodiment, memory 430 may also store temporary variables or other intermediate information while processor 410 is executing instructions. In the illustrated embodiment, chipset 420 connects with processor 410 via Point-to-Point (PtP or P-P) interfaces 417 and 422. Chipset 420 enables processor 410 to connect to other elements in system 400. In some embodiments of the example system, interfaces 417 and 422 operate in accordance with a PtP communication protocol such as the Intel® QuickPath Interconnect (QPI) or the like. In other embodiments, a different interconnect may be used.

In some embodiments, chipset 420 is operable to communicate with processor 410, 405N, display device 440, and other devices, including a bus bridge 472, a smart TV 476, I/O devices 474, nonvolatile memory 460, a storage medium (such as one or more mass storage devices) 462, a keyboard/mouse 464, a network interface 466, and various forms of consumer electronics 477 (such as a PDA, smart phone, tablet etc.), etc. In one embodiment, chipset 420 couples with these devices through an interface 424. Chipset 420 may also be coupled to a wireless antenna 478 to communicate with any device configured to transmit and/or receive wireless signals. In one example, any combination of components in a chipset may be separated by a continuous flexible shield as described in the present disclosure.

Chipset 420 connects to display device 440 via interface 426. Display 440 may be, for example, a liquid crystal display (LCD), a light emitting diode (LED) array, an organic light emitting diode (OLED) array, or any other form of visual display device. In some embodiments of the example system, processor 410 and chipset 420 are merged into a single SOC. In addition, chipset 420 connects to one or more buses 450 and 455 that interconnect various system elements, such as I/O devices 474, nonvolatile memory 460, storage medium 462, a keyboard/mouse 464, and network interface 466. Buses 450 and 455 may be interconnected together via a bus bridge 472.

In one embodiment, mass storage device 462 includes, but is not limited to, a solid state drive, a hard disk drive, a universal serial bus flash memory drive, or any other form of computer data storage medium. In one embodiment, network interface 466 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 4 are depicted as separate blocks within the system 400, the functions performed by some of these blocks may be integrated within a single semiconductor circuit or may be implemented using two or more separate integrated circuits. For example, although cache memory 416 is depicted as a separate block within processor 410, cache memory 416 (or selected aspects of 416) can be incorporated into processor core 412.

Various Notes & Examples

To better illustrate the method and apparatuses disclosed herein, a non-limiting list of embodiments is provided here:

Example 1 can include a semiconductor assembly comprising: a first glass substrate; an electronic integrated circuit ("EIC"); a photonic integrated circuit ("PIC") configured to produce an optical frequency, the PIC comprising an optical port; a bridge die connecting the PIC and the EIC dies, wherein the bridge die is embedded in the first glass substrate; and a coupling adapter comprising: a coupling port configured for connecting to an optical fiber; and a waveguide comprising a laser-modified pathway, wherein the waveguide is integrated with the coupling adapter.

Example 2 can include Example 1, further comprising a second glass substrate, wherein the first glass substrate and the second glass substrate are bound to each other by one or more glass-to-glass bonds.

Example 3 can include Example 1, further comprising an optical fiber connecting to the coupling port.

Example 4 can include Example 1, wherein the coupling port comprises V-grooves.

Example 5 can include Example 1, wherein the coupling adapter comprises a glass adapter.

Example 6 can include Example 1, wherein the coupling port extends to a side of the coupling adapter.

Example 7 can include Example 1, wherein the coupling port extends to a top surface of the coupling adapter.

Example 8 can include Example 1, wherein the bridge die is silicon bridge die.

Example 9 can include Example 1, wherein the EIC and the PIC are coupled to each other through the bridge die and one or more through one or more power delivery pathways.

Example 10 can include Example 1, further comprising a second glass substrate.

Example 11 can include an electronic device comprising: a semiconductor assembly comprising: a first glass substrate; a first integrated circuit die; a second integrated circuit die configured to produce an optical frequency; a bridge die connecting the first and second integrated circuit dies, wherein the bridge die is embedded in the first glass substrate; and a coupling adapter comprising: a coupling port; an output port configured for connection to the second integrated circuit die; and a housing at least partially enclosing the semiconductor assembly.

Example 12 can include Example 11, wherein the second integrated circuit die is a photonic die.

Example 13 can include Example 11, wherein the second integrated circuit die is an electronic integrated circuit.

Example 14 can include Example 11, wherein the coupling port is configured to connection to an optical fiber.

Example 15 can include a method of making a semiconductor assembly, the method comprising: attaching a bridge die to a glass substrate; attaching an electronic integrated circuit die to the glass substrate and the bridge die; attaching a photonic integrated circuit die to the glass substrate and the bridge die, wherein the electronic integrated circuit die is electrically coupled to the photonic integrated circuit die through the bridge die; bonding a coupling adapter to the glass substrate; and forming a waveguide in the coupling adapted, the waveguide aligning with the photonic integrated circuit die.

Example 16 can include Example 15, further comprising attaching a second glass substrate to the first glass substrate prior to attaching the bridge die.

Example 17 can include Example 16, wherein attaching the second glass substrate comprises using glass to glass bonding with a laser.

Example 18 can include Example 15, wherein forming the waveguide comprises a laser directed wiring.

Example 19 can include Example 15, wherein forming the waveguide comprises focusing laser energy in three dimensions within media of the coupling adapter and locally transforming the media of the coupling adapter in a linear path to form a waveguide in the glass adapter extending from the photonic integrated circuit to an outlet.

Example 20 can include Example 15, further comprising aligning the photonic integrated circuit die with the waveguide.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A semiconductor assembly comprising:
    a first glass substrate;
    an electronic integrated circuit ("EIC");
    a photonic integrated circuit ("PIC") configured to produce an optical frequency, the PIC comprising an optical port;
    a bridge die connecting the PIC and the EIC, wherein the bridge die is embedded in the first glass substrate; and
    a coupling adapter, bonded to the first glass substrate, comprising:
        a coupling port configured for connecting to an optical fiber; and
        a waveguide integrated with the coupling adapter.

2. The assembly of claim 1, further comprising a second glass substrate, wherein the first glass substrate and the second glass substrate are bound to each other by one or more glass-to-glass bonds.

3. The assembly of claim 1, further comprising an optical fiber connecting to the coupling port.

4. The assembly of claim 1, wherein the coupling port comprises V-grooves.

5. The assembly of claim 1, wherein the coupling adapter comprises a glass adapter.

6. The assembly of claim 1, wherein the coupling port extends to a side of the coupling adapter.

7. The assembly of claim 1, wherein the coupling port extends to a top surface of the coupling adapter.

8. The assembly of claim 1, wherein the bridge die is silicon bridge die.

9. The assembly of claim 1, further comprising a second glass substrate.

10. The assembly of claim 1, wherein the waveguide comprises a laser-modified pathway.

11. An electronic device comprising:
    a semiconductor assembly comprising:
        a first glass substrate;
        a first integrated circuit die;
        a second integrated circuit die configured to produce an optical frequency;
        a bridge die connecting the first and second integrated circuit dies, wherein the bridge die is embedded in the first glass substrate; and
        a coupling adapter, bonded to the first glass substrate, comprising:
            a coupling port;
            an output port configured for connection to the second integrated circuit die; and
        a housing at least partially enclosing the semiconductor assembly.

12. The device of claim 11, wherein the second integrated circuit die is a photonic die.

13. The device of claim 11, wherein the coupling port is configured to connection to an optical fiber.

14. A method of making a semiconductor assembly, the method comprising:
- attaching a bridge die to a glass substrate;
- attaching an electronic integrated circuit die to the glass substrate and the bridge die;
- attaching a photonic integrated circuit die to the glass substrate and the bridge die, wherein the electronic integrated circuit die is electrically coupled to the photonic integrated circuit die through the bridge die;
- bonding a coupling adapter to the glass substrate; and
- forming a waveguide in the coupling adapter, the waveguide aligning with the photonic integrated circuit die.

15. The method of claim 14, wherein the glass substrate is a first glass substrate, and the method further comprising:
- attaching a second glass substrate to the first glass substrate prior to attaching the bridge die.

16. The method of claim 15, wherein attaching the second glass substrate comprises using glass to glass bonding with a laser.

17. The method of claim 14, wherein forming the waveguide comprises a laser directed wiring.

18. The method of claim 14, wherein forming the waveguide comprises focusing laser energy in three dimensions within media of the coupling adapter and locally transforming the media of the coupling adapter in a linear path to form a waveguide in the coupling adapter extending from the photonic integrated circuit die to an outlet.

19. The method of claim 14, further comprising aligning the photonic integrated circuit die with the waveguide.

\* \* \* \* \*